United States Patent [19]
Lynch

[11] 4,126,042
[45] Nov. 21, 1978

[54] ERROR COMPENSATING NETWORK FOR DIGITAL DISPLAY THERMOMETER

[75] Inventor: Marine D. Lynch, Beaverton, Oreg.

[73] Assignee: Digicon Corporation, Beaverton, Oreg.

[21] Appl. No.: 810,793

[22] Filed: Jun. 28, 1977

[51] Int. Cl.² .............................................. G01K 7/12
[52] U.S. Cl. ..................................................... 73/361
[58] Field of Search ........................ 73/361; 324/105; 361/140; 323/68; 340/228 R

[56] References Cited
U.S. PATENT DOCUMENTS

| | | | |
|---|---|---|---|
| 1,745,149 | 1/1930 | Carney | 73/361 |
| 3,461,380 | 8/1969 | McGhee | 73/361 |
| 3,650,154 | 3/1972 | Arnett et al. | 73/361 |
| 3,921,453 | 11/1975 | Platzer | 73/361 |

*Primary Examiner*—Anthony V. Ciarlante
*Attorney, Agent, or Firm*—Clarence A. O'Brien; Harvey B. Jacobson

[57] ABSTRACT

The junction of a thermocouple is connected to one input of a differential amplifier disposed in a feedback configuration with a voltage-to-current converter for providing a signal current that is a measure of the temperature within a region being monitored by the thermocouple junction. A terminal of the thermocouple outside of the monitored region is directly connected through voltage dividing resistors to the differential amplifier and an active element of the converter to nullify the error introduced by ambient temperature variations.

16 Claims, 3 Drawing Figures

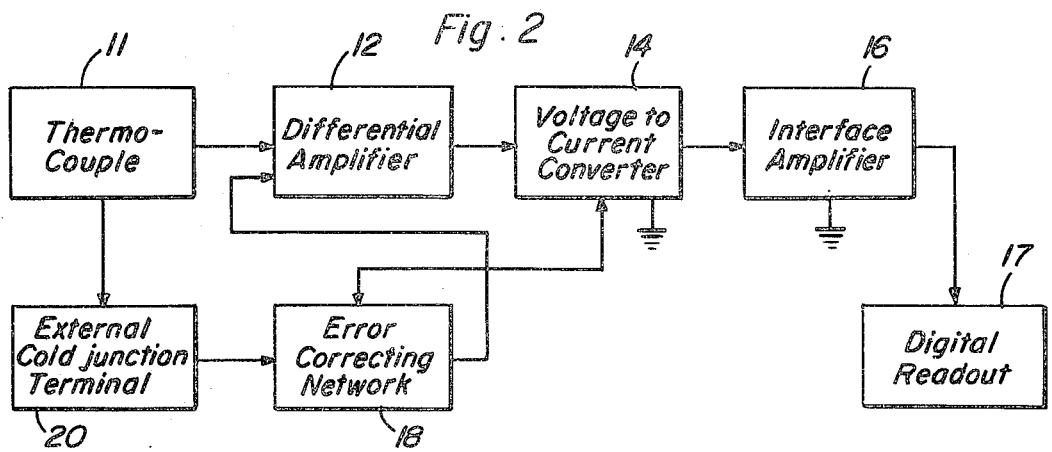
Fig. 2
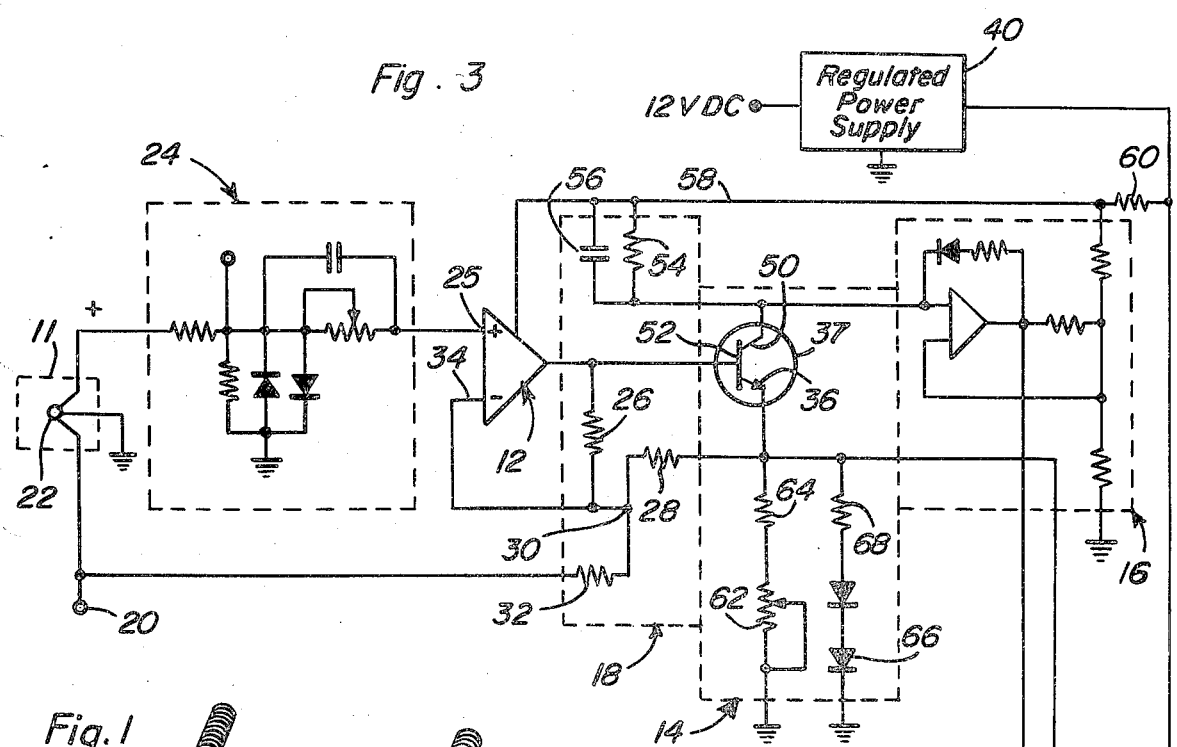
Fig. 3
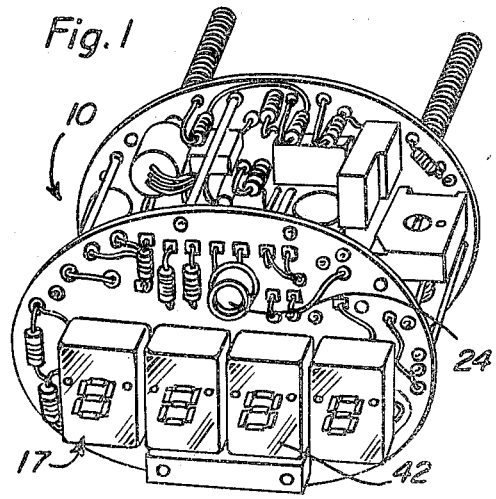
Fig. 1
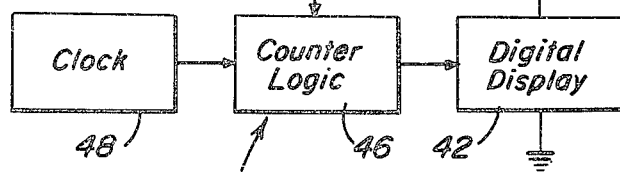

ERROR COMPENSATING NETWORK FOR DIGITAL DISPLAY THERMOMETER

BACKGROUND OF THE INVENTION

This invention relates generally to digital thermometers of the thermocouple type and more particularly to an error compensating network for such digital thermometers.

Thermocouple sensing thermometers are generally well known. In such thermometers, the dissimilar metals forming the thermocouple junction are located within a temperature region to be monitored and generate an electrical potential that is compared with a D.C. reference voltage to measure the temperature being sensed. A temperature measuring error is introduced in such thermometers because of ambient temperature variations to which the thermocouple terminals are exposed outside the monitored region. The use of a separate external cold junction or a reference junction connected to the thermocouple have been proposed for error compensating purposes. Such error compensating means are necessarily accompanied by an additional reference voltage source and other circuit complicating components that increase the cost and calibrating difficulties associated with such thermometers.

It is therefore an important object of the present invention to provide a digital thermometer having a thermocouple sensor with an error compensating network incorporated therein to nullify the effect of ambient temperature variation in an effective and economical manner and avoiding the complexities and problems associated with prior art error compensating arrangements.

DESCRIPTION OF THE PRIOR ART

Applicants are aware of the following prior U.S. Pat. Nos.:
Carney — 1,745,149
McGhee — 3,461,380
Arnett — 3,650,154
Platzer — 3,921,453

Each of the foregoing patents relates to a DC voltage sensing circuit associated with a thermocouple, wherein a reference voltage is applied to the negative terminal of the thermocouple and the voltage across said terminals is measured in order to monitor the temperature in the region within which the thermocouple junction is located. The Arnett and Platzer patents furthermore provide means to compensate for temperature variations outside of the region being monitored through a reference junction connected to a voltage source for comparison with the thermocouple junction potential. The compensating action of the reference junction in the case of the Arnett patent allegedly nulls any change in voltage between the thermocouple terminals caused by ambient temperature changes, through an impedence network type of reference junction connected between the negative thermocouple terminal and a readout device. The variable output of the reference junction corrects the differential output of an amplifier connected in series with an interface power amplifier operating the readout device. A separate linearizer is required, connected in series between the output of the interface amplifier and the readout device. Also separate DC sources of voltage are required for the differential amplifier and the reference junction, respectively. The complexities and problems introduced by the foregoing arrangement, is avoided by the present invention.

SUMMARY OF THE INVENTION

A temperature sensing thermocouple is connected to the non-inverting input terminal of a conventional type of differential amplifier connected to a voltage-to-current converting transistor. The inverting input terminal of the differential amplifier is connected to its output through a feedback resistor and separated by a voltage dividing resistor from the active emitter of the transistor. One terminal of the thermocouple, thermally connected to and located externally of the temperature region being monitored, is directly connected by a coupling resistor to the junction of the feedback and voltage dividing resistors so as to apply the terminal potential to both the inverting input of the differential amplifier and the emitter circuit of the transistor. Errors introduced at this cold junction terminal because of ambient temperature variations are thereby nullified in the signal current which is conducted through the collector-emitter circuit of the transistor in response to the differential output of the amplifier applied to the input base of the transistor. The output signal at the collector of the transistor drives a digital readout component through an interface amplifier.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing a digital thermometer constructed in accordance with the present invention.

FIG. 2 is a block diagram schematically depicting the circuit associated with the digital thermometer.

FIG. 3 is a circuit diagram of the digital thermometer.

DETAILED DESCRIPTION OF A PREFERRED EMBODIMENT

Referring now to the drawings in detail, FIG. 1 shows a typical digital thermometer constructed in accordance with the present invention and generally denoted by reference numeral 10. The thermometer is suitably mounted at a location externally of the region being monitored by a thermocouple 15 associated therewith, and is exposed to ambient temperature conditions.

FIG. 2 shows a block diagram depicting the thermocouple 11 electrically connected to one input terminal of a conventional differential amplifier 12 associated with the digital thermometer. The output of the amplifier 12 is connected to a signal converter 14 through which the amplified signal output of the thermocouple is fed to an interface amplifier 16 to drive a digital readout component 17. The other input terminal of the differential amplifier receives a signal from an error correcting network 18 which is connected to an active element of the signal converter 14, in accordance with the present invention, to provide a differential output fed to the signal converter. The error correcting network thermally connects the signal converter to the cold junction of the thermocouple through an input terminal 20 located externally of the region being monitored.

FIG. 3 shows the thermocouple junction 22 located in the region to be monitored. The junction 22 is electrically poled with respect to the differential amplifier 12 so that the positive terminal of the thermocouple is electrically connected by an adjustable impedance network 24 to a non-inverting signal input 25 of the amplifier. The negative cold junction terminal 20 of the thermocouple located outside of the monitored region where atmospheric ambient temperature error is ordinarily introduced, is electrically connected to the error correcting network 18. The network 18 includes a feedback resistor 26 and a voltage dividing resistor 28 having a common junction 30 to which the cold junction input terminal 20 is connected through a coupling resistor 32. The potential at terminal 20 is thus applied directly through resistor 32 to the inverting input 34 of the differential amplifier, while resistor 28 applies the potential to the active element of converter 14 in the form of emitter 36 of a NPN transistor 37. Power for operating the amplifier 12 and transistor 37 is derived from a regulated, DC power supply 40 which also operates a digital display unit 42 and the interface amplifier 16. Pulse signals fed by amplifier 16 to counter logic 46 of the digital readout 17 control the supply of timing pulses from clock 48 to operate the digital display. The amplifier 16 receives its input signal from the collector 50 of the transistor 37.

The thermocouple junction 22 as aforementioned, is within the region being sensed so that the dissimilar metals thereof generate a potential which reflects the temperature in said region. Any difference in potential between the junction metals conducts signal current to the corresponding inputs 25 and 34 of the amplifier 12. The differential output voltage of amplifier 12 is applied to the input base electrode 52 of transistor 37 so as to supply a corresponding signal current from collector 50 to the amplifier 16. Collector bias commensurate with operation of transistor 37 both as a signal converter and a temperature sensing device is established through resistor 54 and capacitor 56 forming part of the error correcting network. Bias voltage is derived from the voltage supply line 58 connected by voltage reducing resistor 60 to the power supply 40. Emitter bias for transistor 37 is maintained at an adjusted level to properly operate the interface amplifier 16 by adjustable ground resistor 62 connected in series with resistor 64 to the emitter 36. Emitter bias voltage is limited by the series connected diodes 66 and resistor 68 also connected between ground and the emitter.

The bias level of the emitter 36 is varied in accordance with the present invention to help nullify the effect of ambient temperature variations on the thermocouple cold junction. This is achieved by applying the cold junction potential through resistor 32 directly to the inverting input 34 of the diffential amplifier and through the voltage reducing resistor 28 to emitter 36. The feedback resistor 26 between the input base 52 of the transistor 37 and the inverting input 34 maintains a substantially linear relationship between the signal inverted input and the amplified output of the differential amplifier. The differential output voltage of amplifier 12 is applied to the base 52 of transistor 37 so as to conduct therethrough a signal current of a magnitude that ordinarily reflects both the temperature of the region being monitored by the thermocouple 10 and ambient temperature externally of said region at terminal 20. The error producing effect of ambient temperature applied to the inverting input 34 of the differential amplifier 12 by the network 18 is nullified by the bias varying connection to the active emitter element 36 of transistor 37 established through resistors 32 and 28.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is as follows:

1. In a thermometer having a thermocouple formed by a junction of dissimilar metals located in a monitored region and connected to terminals of opposite polarity located externally of said region, differential amplifier means having inverting and non-inverting inputs connected to said terminals for producing a voltage output responsive to a difference in potential generated at said junction reflecting changes in temperature of the monitored region, signal converting means connected to said amplifier means for conducting signal current as a function of the voltage output from the amplifier means, readout means connected to the signal converting means for registering the magnitude of the signal current conducted reflecting the temperature of said monitored region, and error correcting means directly connected to one of the terminals exposed to ambient temperature conditions for correctively varying the current conducted through the signal converting means.

2. The combination of claim 1 wherein said signal converting means includes an input element receiving the voltage output of the amplifier means, and at least two active elements respectively connected to the error correcting means and the readout means.

3. The combination of claim 2 wherein said error correcting means includes resistive means connecting said one of the terminals of the thermocouple to the inverting input of the amplifier means and one of the active elements of the signal converting means, and signal feedback means connecting the input element of the signal converting means to the inverting input of the amplifier means.

4. The combination of claim 3 wherein said readout means includes a digital display and counter logic means driven by said signal converting means for operating the display.

5. The combination of claim 4 wherein said input element of the signal converting means is a transistor base and said one of the active elements is an emitter, the other of the active elements being a collector connected to the readout means.

6. The combination of claim 3 wherein said input element of the signal converting means is a transistor base and said one of the active elements is an emitter, the other of the active elements being a collector connected to the readout means.

7. The combination of claim 2 wherein said input element of the signal converting means is a transistor base and said one of the active elements is an emitter, the other of the active elements being a collector connected to the readout means.

8. The combination of claim 1 wherein said error correcting means includes resistive means connecting said one of the terminals of the thermocouple to the inverting input of the amplifier means and to the signal converting means, and signal feedback means connecting the input element of the signal converting means to the inverting input of the amplifier means.

9. The combination of claim 1 wherein said readout means includes a digital display and counter logic means driven by said signal converting means for operating the display.

10. The combination of claim 1 wherein said signal converting means includes an active element through which the signal current is conducted and control means for maintaining an adjusted bias on said active element.

11. The combination of claim 10 wherein said error correcting means includes resistive means connecting said one of the terminals of the thermocouple to the inverting input of the amplifier means and to said active element for varying the bias thereon.

12. In a thermometer having a thermocouple formed by a junction of dissimilar metals located in a monitored region and connected to terminals of opposite polarity located externally of said region, a differential amplifier having a signal input terminal connected to one of the terminals of the thermocouple, a second input terminal and an output terminal, a signal converting device having an input electrode connected to the output terminal of the amplifier and a pair of current conducting electrodes, a readout display, interface means connected to one of the current conducting electrodes for driving said display, adjustable means connected to the other of the current conducting electrodes for maintaining a predetermined bias voltage thereon, and error correcting means connecting the other of the current conducting electrodes and the second input terminal of the differential amplifier directly to the other of the terminals of the thermocouple for correctively varying the bias voltage on said other of the electrodes.

13. In combination with a temperature sensing thermocouple having a cold junction exposed to ambient temperature, a differential amplifier device connected to the thermocouple for producing a voltage output affected by said ambient temperature, current conducting means connected to the differential amplifier device having an active element through which a signal current is conducted in response to said voltage output and error correcting means directly connecting said cold junction of the thermocouple to the active element for correctively varying the signal current conducted therethrough.

14. The combination of claim 13 wherein said differential amplifier device includes a non-inverting input connected to the thermocouple, an inverting input connected to the error correcting means, an output, and feedback means interconnecting the inverting input and the output.

15. The combination of claim 14 wherein said current conducting means is a transistor having an emitter constituting said active element, an input base connected to the output of the differential amplifier device and an output collector.

16. In combination with a temperature sensing thermocouple having a cold junction and connected to a differential amplifier circuit having a voltage-to-current converter associated therewith in a signal feedback configuration for operating a digital display, means of nullifying the effect of ambient temperature variation at the cold junction of the thermocouple, comprising error compensating means for thermally connecting the cold junction to the converter to vary signal current conducted therethrough in response to variations of the ambient temperature, said converter including an active element through which the signal current is conducted, said error compensating means including means electrically connected directly between the cold junction and the active element.

* * * * *